(12) United States Patent
Shirai et al.

(10) Patent No.: US 7,246,672 B2
(45) Date of Patent: Jul. 24, 2007

(54) HYBRID-VEHICLE POWER TRAIN

(75) Inventors: Hisanori Shirai, Aichi-ken (JP); Masahiro Hasebe, Aichi-ken (JP)

(73) Assignee: Kabushikikaisha Equos Research, Chiyoda-ku, Tokyo (JP)

( * ) Notice: Subject to any disclaimer, the term of this patent is extended or adjusted under 35 U.S.C. 154(b) by 69 days.

(21) Appl. No.: 10/705,230

(22) Filed: Nov. 12, 2003

(65) Prior Publication Data
US 2004/0124021 A1 Jul. 1, 2004

(30) Foreign Application Priority Data
Nov. 29, 2002 (JP) ............................. 2002-347329

(51) Int. Cl.
*B60K 6/04* (2006.01)
(52) U.S. Cl. .................... 180/65.2; 477/3; 903/910; 903/918
(58) Field of Classification Search ............... 180/65.2, 180/65.3, 65.4; 477/3, 6, 8; 475/5, 1; 903/910, 903/918
See application file for complete search history.

(56) References Cited

U.S. PATENT DOCUMENTS 5,803,859 A * 9/1998 Haka ........................ 475/211
6,007,443 A * 12/1999 Onimaru et al. ............... 475/5
6,344,008 B1 * 2/2002 Nagano et al. ................ 475/1
6,346,062 B1 * 2/2002 Shimabukuro et al. ........ 477/5
6,377,883 B1 * 4/2002 Shimabukuro et al. ....... 701/51
6,524,216 B2 * 2/2003 Suzuki et al. ................. 477/3

FOREIGN PATENT DOCUMENTS

| EP | 0 800 949 A2 * | 4/1997 |
|---|---|---|
| JP | 11-107798 | 4/1999 |
| JP | 2002-139136 | 5/2002 |

* cited by examiner

Primary Examiner—Frank Vanaman
(74) Attorney, Agent, or Firm—Bacon & Thomas, PLLC

(57) ABSTRACT

A hybrid-vehicle power train connected to an engine comprises a motor, a CVT unit, a planetary gear unit having at least two input elements, namely, first and second input elements and an output element, a first clutch for engaging/disengaging the first input element with/from a final shaft of the power train, and a second clutch for engaging/disengaging the output element with/from the final shaft of the power train. An input shaft of the CVT unit is connected to the engine and is drivingly connected to the second input element. An output shaft of the CVT unit is connected to the first input element. The motor is connected to the output shaft of the CVT unit. According this configuration, motor torque is amplified and transmitted to the final shaft when the first clutch is engaged, while motor torque is transmit directly to the final shaft when the second clutch is engaged.

7 Claims, 6 Drawing Sheets

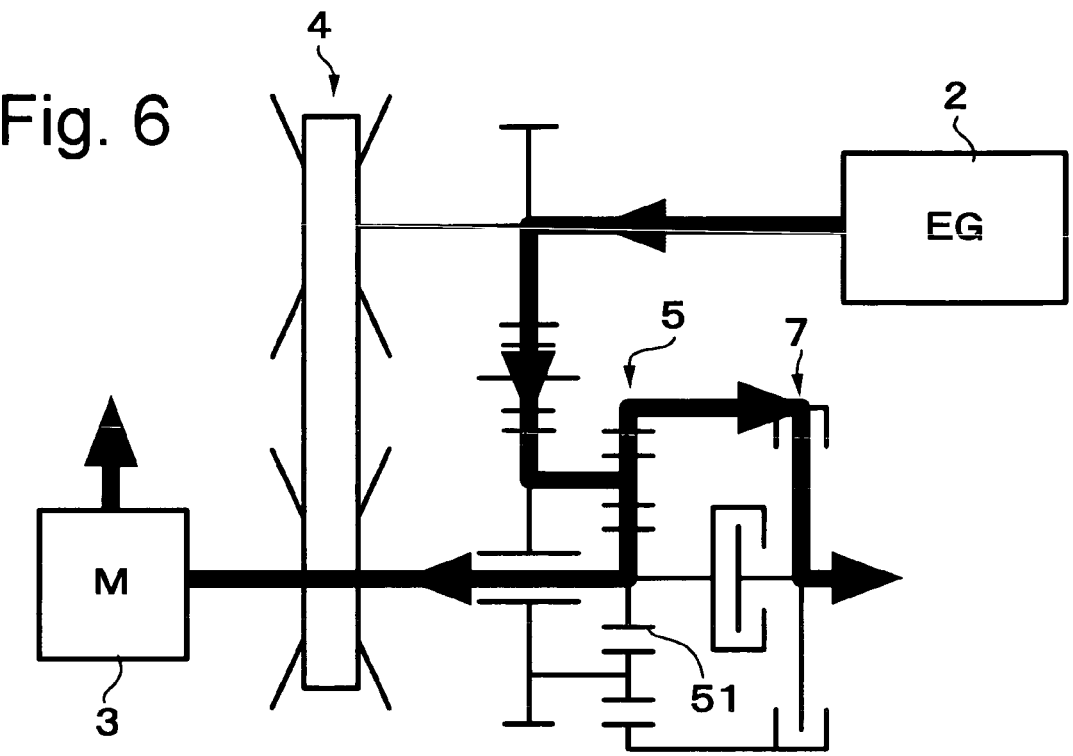
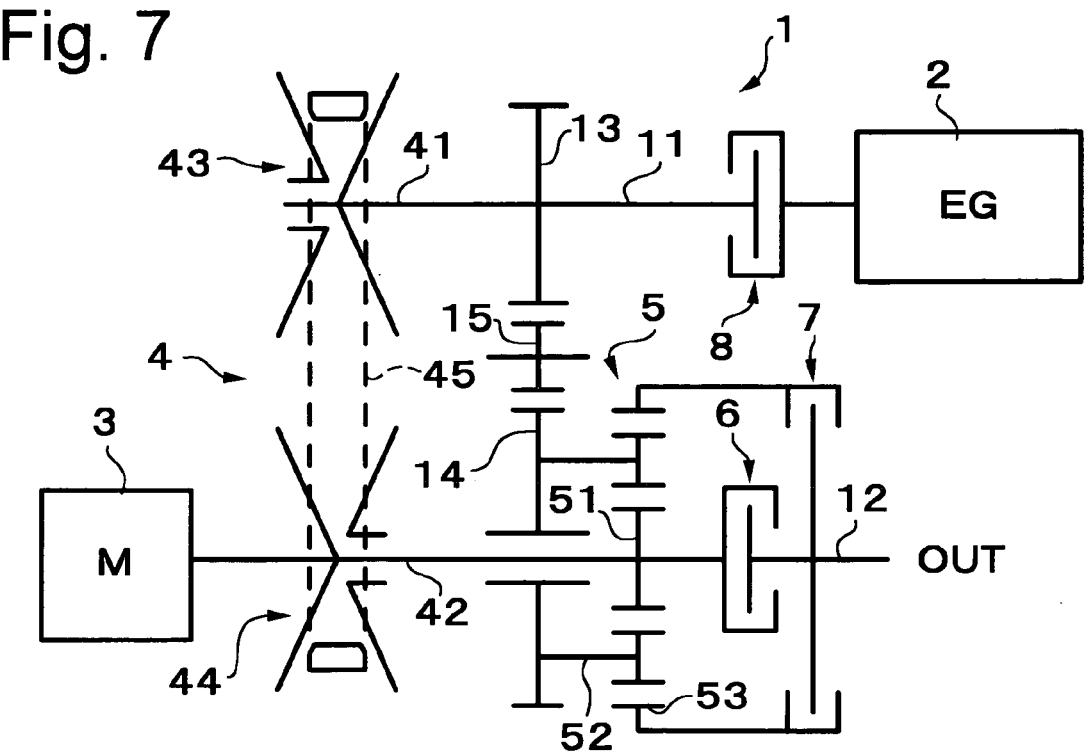

HYBRID-VEHICLE POWER TRAIN

CROSS-REFERENCE TO RELATED APPLICATIONS

This application claims, under 35 USC 119, priority of Japanese Application No. 2002-347329 filed on Nov. 29, 2002.

INCORPORATION BY REFERENCE

The disclosure of Japanese Patent Application No. 2002-347329 filed on Nov. 29, 2002, including the specification, drawings, and abstract is incorporated herein by reference in its entirety.

BACKGROUND OF THE INVENTION

1. Field of the Invention

The present invention relates to a hybrid-vehicle power train and, more particularly, to a hybrid-vehicle power train equipped with a CVT (continuously variable ratio transmission) unit.

2. Description of the Related Art

For a hybrid-vehicle which has an engine (which means as internal combustion engine or an external engine in the present specification), an motor (which means a motor or a motor-generator in the present specification) and an transmission, a power train applying an infinitely variable transmission (referred to as an IVT) in which a CVT unit is combined with a planetary gear unit is known as a related art. The IVT can shift between a torque circulation mode and an engine torque directly transmission mode.

In the related art, two types of configuration of power train are known. The two types of configuration are discriminated depending on positional relationship, regarding to a power flow path, between the motor and the IVT.

One is shown in FIG. 11, a motor (M) is disposed on the side of an input shaft of an IVT with respect to an engine (E/G) and the IVT, namely, between the engine and the IVT (see Japanese Patent Application Laid-Open No. 11-107798).

The other is shown in FIG. 12, a motor (M) is disposed on the side of an output shaft of an IVT. That is, an engine (E/G), the IVT, and the motor (M) are arranged in this order (see Japanese Patent Application Laid-Open No. 2002-139136).

In the related arts described in the aforementioned two patent publications (hereinafter referred to as the first and second related arts), a belt-type CVT unit is exemplified as the CVT unit of the IVT. As a matter of course, however, as described in a paragraph [0094] of Japanese Patent Application Laid-Open No. 11-107798, a CVT unit of another type such as a toroidal type or the like can also be employed in the power train. A toroidal type IVT is disclosed, for example, in pages 18 to 25 of "KOYO Engineering Journal" No. 161.

A configuration wherein a motor is disposed on the side of an input shaft of a transmission as in the case of the first related art will now be reviewed as to the following two cases.

(1) In the case where engine torque is assisted by the motor, since output torque of the motor is amplified by an IVT, there is an advantage in that large torque is available on the output side (i.e., on the side of an axle) of the IVT using the relatively small size motor. On the other hand, the efficiency in transmitting motor torque to the axle depends on the torque transmission efficiency of the IVT. Therefore, if the IVT exhibits low transmission efficiency, there is a disadvantage in that the motor exhibits low torque transmission efficiency as well.

(2) In the case where energy is regenerated by the motor, regenerable energy is regenerated by the motor with low efficiency in a low rotational speed range. In this case, since rotational speed at the engine side is higher than at the axle side owing to gear ratio of the IVT, there is an advantage in that energy can be regenerated with high rotational speed and high efficiency. On the other hand, however, there is also a disadvantage in that, because of the IVT power transmitting efficiency (power loss factor), the amount of motor regenerable energy is reduced from the amount of energy generated on the side of the axle.

A configuration wherein a motor is disposed on the side of an output shaft of an IVT as in the case of the second related art will now be reviewed as to the following two cases.

(1) In the case where engine torque is assisted by the motor, since motor torque is directly transmitted to the axle side, there is an advantage in that high torque transmission efficiency is achieved. On the other hand, however, there is also a disadvantage in that required torque on the axle side is directly associated with torque required of the motor, and in that the motor must be relatively large in size.

(2) In the case where energy is regenerated by the motor, there is an advantage in that the entire regenerable energy generated on the axle side can be received by the motor, irrespective of power transmission efficiency of the IVT. On the other hand, however, since rotation on the axle side is directly transmitted to the motor, there is a disadvantage in that a low rotational speed range on the axle side is directly associated with low regenerative efficiency of the motor itself, and in that energy is regenerated with low rotational speed and low efficiency.

The aforementioned advantages and disadvantages will be summarized as follows. In the configuration of the first related art, although the motor may be designed to generate a small torque, power is always transmitted through the IVT (which is generally inferior in efficiency to a staged transmission of planetary gear type), so that the overall efficiency worsens. In the configuration of the second related art, on the other hand, since the motor and the axle are directly connected without the intervention of the IVT, the overall efficiency (motor efficiency×transmission efficiency) is high, but a large torque is required of the motor.

A relationship among output, torque, and rotational speed is taken into account, a rise in rotational speed is linked with a decrease in torque for an equal output. In other words, a rise in vehicle speed is linked with a decrease in torque of the axle. Therefore, in high vehicle speed region, the second related art is deprived of its disadvantage and thus becomes advantageous. On the contrary, in low vehicle speed region, the first related art is advantageous if the vehicle runs at a low speed. As is apparent from the foregoing description, it would be ideal to selectively utilize the first related art and the second related art for a low vehicle speed and a high vehicle speed respectively. Heretofore, however, no good method of selectively utilizing them has been found.

SUMMARY OF THE INVENTION

In the present invention, therefore, the fact that the torque flow path inside the IVT is switched depending on whether the vehicle is in a low vehicle speed range or in a high vehicle speed range has been taken into account in order to solve the problems stated above. It is an object of the present invention to realize a hybrid system that combines and exerts the advantages of the aforementioned related arts by fully applying the aforementioned IVT's characteristic. More specifically, it is an object of the present invention to provide a hybrid-vehicle power train wherein a motor is disposed, regarding a power flow path, on the input side of a transmission in a low vehicle speed range or a torque circulation mode, wherein the motor is disposed, regarding a power flow path, on the output side of the transmission in a high vehicle speed range or a engine torque directly transmission mode, and wherein the motor can be efficiently utilized depending on whether a vehicle is in the low vehicle speed range or in the high vehicle speed range.

To achieve the object stated above, according to one aspect of the present invention, there is provided a hybrid-vehicle power train connected to an engine, which comprises a motor; a planetary gear unit with at least three elements, namely, first and second input elements and an output element; a first clutch for engaging/disengaging the first input element of the planetary gear unit with/from a final shaft of the power train; a second clutch for engaging/disengaging the output element with/from the final shaft of the power train; and a CVT unit having an input and a output shaft, the input shaft is connected to the engine and is drivingly connected to the second input element of the planetary gear unit, the output shaft is connected to the first input element. In this hybrid-vehicle power train, the motor is connected to the output shaft of the CVT unit.

In this configuration, when the second clutch is engaged during an operation in which output torque of the engine is assisted by output torque of the motor, the output torque of the motor is input to the second input element of the planetary gear unit via the CVT unit combined with the output torque of the engine, and is transmitted to the output shaft. At the same time, part of the motor and engine torque is again input to the second input element via the first element and the CVT unit, as counter torque received by the first element from the torque on the output element. Namely, torque circulation is caused. Further, when the first clutch is engaged, output torque of the motor is transmitted directly to the output shaft through the first input element, and assists an output torque of the engine which is input to the first input element via the CVT unit.

According to this configuration, motor torque is amplified by the CVT gear ratio in the torque circulation mode in which the second clutch is engaged. Therefore, a large torque can be output from the final shaft of the power train. And when the motor is driven by torque on the axle, because a rotational speed of the motor is higher than a rotational speed on the side of the final shaft of the power train, regeneration of energy can be realized in a rotational speed range corresponding to high regeneration efficiency. In the direct torque transmission mode in which the first clutch is engaged, since motor torque can be transmitted to an axle without passing through the CVT unit, an improvement in motor torque transmission efficiency is made. Regenerable energy generated in the axle can also be regenerated by the motor without any power loss in the CVT unit.

In the aforementioned aspect of the present invention, it is advantageous to adopt a configuration in which a third clutch for disengaging the power train from the engine is provided. In this configuration, the third clutch is arranged on upstream, in terms of power flow path, of both connection points; one between the input shaft of the CVT unit and the engine; the other between the input shaft and the second input element of the planetary gear unit.

In this configuration, when the third clutch is engaged, the same operation as in the aforementioned aspect of the present invention is substantially produced. When the third clutch and the second clutch are released and engaged respectively, output torque of the motor which is input to the second input element of the planetary gear unit via the CVT unit is transmitted to the output shaft, and then is input again to the second input element via the first input element and the CVT unit as counter torque of the torque input from the second input element. Namely, torque circulation is caused. When the third clutch and the first clutch are released and engaged respectively, output torque of the motor is directly output to the output shaft through the first input element.

According to this configuration, by disengaging the engine from the power train during motor regeneration based on coasting, a loss in regenerative energy resulting from the dragging of the engine can be eliminated. As is the case with an existing hybrid system, the engine can use only in rotational-speed and load ranges corresponding to good fuel consumption. In this case, it is also possible to eliminate dragging resistance produced by causing the engine to rotate with the supply of fuel being suspended. Further, the engine can also be stopped or restarted at a suitable and required timing while the vehicle runs.

In the aforementioned aspect of the present invention, the motor may be disposed coaxially on the output shaft of the CVT unit. According to this configuration, since the motor and the planetary gear unit are coaxially disposed, the power train can be simplified in arrangement of each unit. If a CVT unit whose input and output shafts are coaxially disposed is employed as the CVT unit, the power train can be made compact as well through arrangement of the motor, the CVT unit, and the planetary gear unit along a single axis.

In the aforementioned aspect of the present invention, the motor may be drivingly connected to the output shaft of the CVT unit and be disposed on a shaft different from the output shaft of the CVT unit. According to this configuration, since the motor can be disposed at an arbitrary position on the power train, the degree of freedom in designing the power train can be enhanced. By adopting driving connection of parallel shafts, a suitable change gear ratio can be set between the motor and the first input element of the planetary gear unit. Therefore, the motor can be operated with a small torque and at a high rotational speed by selecting a speed-reducing ratio, while the motor can be operated with a large torque and at a low rotational speed by setting a speed-increasing ratio. According to this configuration, it is also possible to adopt a configuration wherein a parallel-shaft driving connection unit is located at an outermost position and wherein the motor is disposed side by side with the CVT unit and the planetary gear unit. This configuration is advantageous in reducing the overall length of the power train.

In the aforementioned aspect of the present invention, the CVT unit may be disposed between the motor and the planetary gear unit. According to this configuration, since the motor and the planetary gear unit are coaxially disposed, the power train can be simplified in arrangement. If a CVT unit whose input and output shafts are coaxially disposed is employed as the CVT unit, the power train can be made compact as well through arrangement of the motor, the CVT unit, and the planetary gear unit along a single axis.

In the aforementioned aspect of the present invention, the motor may be disposed at an axial position between the CVT unit and the planetary gear unit. According to this configuration, by selecting either disposition of the motor on the same shaft as the output shaft of the CVT unit or disposition of the motor on a shaft different from the output shaft of the CVT unit, the effects corresponding to those of the two last-mentioned configurations can be achieved. In the aforementioned aspect of the present invention, the motor may be a motor-generator that also has a function of generating electricity.

BRIEF DESCRIPTION OF THE DRAWINGS

FIG. 6 illustrates how the power train operates in a split mode;

FIG. 7 is a skeleton diagram showing a gear train in accordance with a second embodiment of the present invention;

DETAILED DESCRIPTION OF PREFERRED EMBODIMENTS

Figure 1:
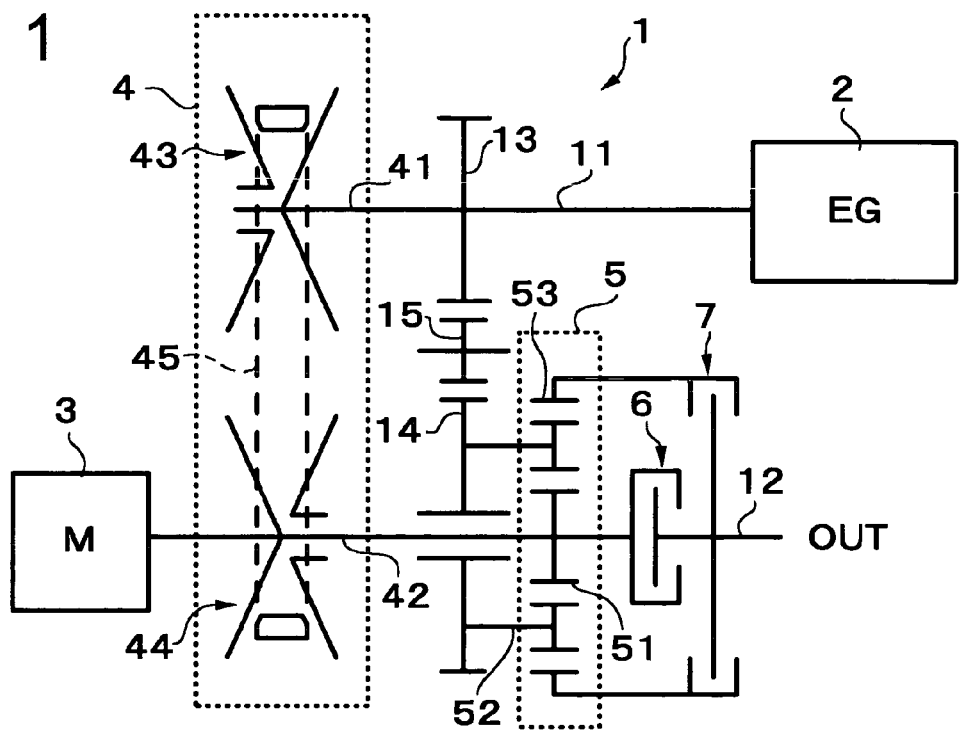
FIG. 1 is a skeleton diagram showing a gear train of a hybrid-vehicle power train in accordance with a first embodiment of the present invention.

Hereinafter, the embodiments of the present invention will be described with reference to the drawings. First of all, FIG. 1 shows, as a skeleton diagram, the configuration of a vehicular power train 1 in accordance with the first embodiment of the present invention. This power train 1 constitutes a hybrid-vehicle power train connected to an engine 2. The power train 1 comprises a motor 3, a CVT unit 4, a planetary gear unit 5 having first and second input elements 51 and 52 and an output element 53, a first clutch 6 for engaging/disengaging the first input element 51 of the planetary gear unit 5 with/from a final shaft 12 of the power train 1, and a second clutch 7 for engaging/disengaging the output element 53 with/from the final shaft 12 of the power train 1. An input shaft 41 of the CVT unit 4 can be connected to the engine 2, and also drivingly connected to the second input element 52 of the planetary gear unit 5. An output shaft 42 of the CVT unit 4 is connected to the first input element 51. According to the features of the present invention, a configuration wherein the motor 3 is connected to the output shaft 42 of the CVT unit 4 is adopted.

More specifically, an input shaft 11 of the power train 1 can be connected to the engine 2 via a drive plate (not shown). The final shaft 12 that is parallel to the input shaft 11 can be connected to an axle via a differential unit and a universal joint. In order to transmit power between two parallel shafts, namely, the input shaft 41 and the output shaft 42, the CVT unit 4 is constructed as a known CVT unit wherein a belt 45 is hung between a primary pulley 43 disposed on the side of the input shaft 41 and a secondary pulley 44 disposed on the side of the output shaft 42 and wherein continuous changes in transmission ratio are made possible by controlling a width between a pair of pulleys. The planetary gear unit 5 is constructed as a simple planetary gear set composed of a sun gear 51, a carrier 52, and a ring gear 53. The carrier 52 rotatably supports a plurality of pinion gears meshing with the sun gear 51 in a circumscribed manner. The ring gear 53 meshes with the pinion gears in an inscribed manner. Each of the first and second clutches 6 and 7 is constructed as a wet multiple-disc clutch wherein many discs made of a friction material are disposed between a hub and a drum and wherein a hydraulic servo controls engagement and release of the discs.

In this embodiment, the sun gear 51 of the simple planetary gear set is the first input element of the planetary gear unit 5, the carrier 52 is the second input element of the planetary gear unit 5, and the ring gear 53 is the output element of the planetary gear unit 5. Because the input and final shafts 11 and 12 of the power train 1 are disposed parallel to each other, a gear unit is employed as a parallel-shaft driving connection unit so as to drivingly connect the carrier 52 rotatable on the final shaft 12 to the input shaft 11. This gear unit is constructed such that a driven gear 14 is meshed with a drive gear 13 via an idler gear 15. The drive gear 13 is disposed on the input shaft 11 in such a manner as to be unable to rotate relative thereto. The driven gear 14 is connected to the carrier 52 in such a manner as to be unable to rotate relative thereto. As this parallel-shaft driving connection unit, it is also possible to employ a unit dispensing with an idler gear that is disposed as an intermediate shaft so as to make rotational directions of the input and output shafts coincident with each other. Examples of such a unit include a chain-type transmission unit and a belt-type transmission unit. In the chain-type transmission unit, both the drive and driven sides are constructed as sprockets, and a chain is wound around the sprockets. In the belt-type transmission unit, both the driven and drive sides are constructed as pulleys, and a belt is wound around the pulleys. Thus, this power train is constructed as follows. Namely, the drive gear 13 and an input-side pulley 43 of the CVT unit 4, which are arranged in this order from the side of the engine, are disposed coaxially with the input shaft 11 connected to an output shaft of the engine 2. The motor 3, an output-side pulley 44 of the CVT unit 4, the driven gear 14, the planetary gear unit 5, the first clutch 6, and the second clutch 7, which are arranged in this order toward the engine, are disposed on the final shaft 12 that is parallel to the input shaft 11.

Figure 2:
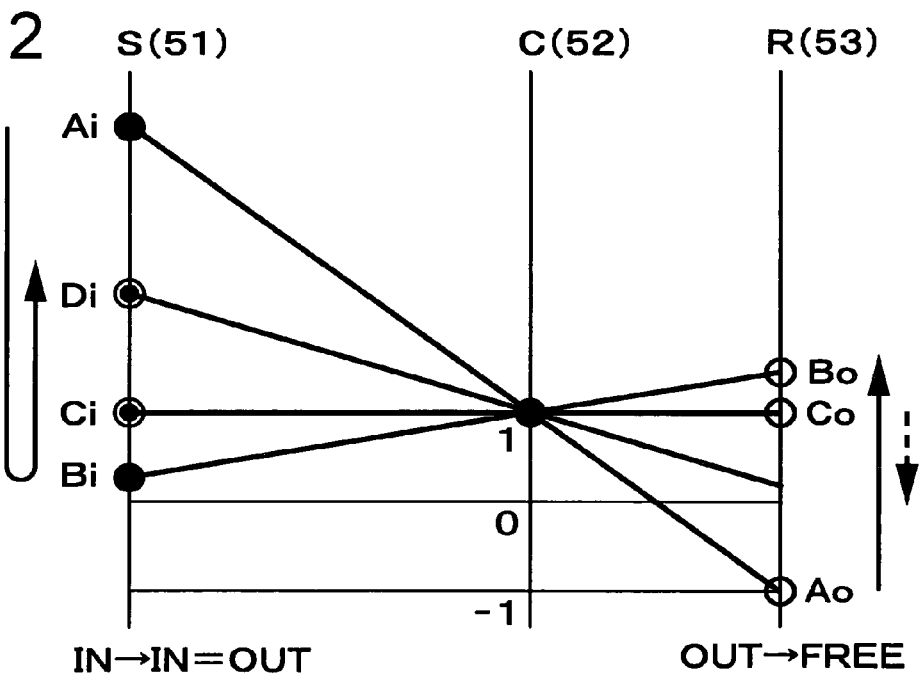
FIG. 2 is a speed diagram showing operation of a planetary gear unit of the power train.

Next, operation of the power train constructed as described above will be described. In this power train, there is established a relationship wherein the motor 3 is directly connected to the sun gear 51 via the output shaft 42 of the CVT unit 4. At the same time, the motor 3 is drivingly connected to the carrier 52 via the CVT unit 4. When this relationship is expressed as a relationship in rotational speed ratio among the three elements of the planetary gear set 5, a speed diagram as shown in FIG. 2 is obtained. In FIG. 2, axes of ordinate represent the sun gear (S) 51, the carrier (C) 52, and the ring gear (R) 53 respectively. A vertical position of each of the axes of ordinate represents a speed ratio of a corresponding one of the elements. It is assumed herein that rotation of the engine 2 corresponds to a reference value of 1, and that a speed ratio of the carrier (c) 52 that is drivingly connected to the engine 2 is not increased or reduced by the gears 13 and 14. By reducing a rotational speed of the sun gear (S) 51 from high-speed (overdrive) rotation of an input speed ratio Ai to low-speed (underdrive) rotation of an input speed ratio Bi as indicated by an arrow making a U-turn on the left side of FIG. 2, the speed ratio of the ring gear (R) 53 changes from a negative speed ratio Ao corresponding to reverse rotation to a certain speed-increasing speed ratio Bo. This operation is caused by continuously changing a speed of the CVT unit 4 from a speed-increasing state to a speed-reducing state as indicated by an upward arrow on the right side of FIG. 2. If the second clutch 7 is held engaged in this state, the final shaft 12 can output an output speed ratio ranging from a speed ratio corresponding to reverse rotation to a certain speed-increasing speed ratio. In conjunction with the operation described hitherto, the second clutch 7 relates to the outputting of relatively low rotational speeds and thus will be referred to as a low clutch in the following description.

If the low clutch 7 and the first clutch 6 are released and engaged respectively during the aforementioned operation when the sun gear (S) 51 is at an equal-speed speed ratio Ci, the sun gear (S) 51 becomes an input/output element leading to the final shaft 12. Then, by continuously changing a speed of the CVT unit 4 in such a manner as to return it from an equal-speed state to a speed-increasing state, the speed ratio of the sun gear (S) 51 is increased from the equal-speed speed ratio Ci to a high-speed speed ratio Di. This rotation results in a speed ratio of the final shaft 12. At this moment, rotation of the ring gear (R) 53 that is in an idling state changes from an equal-speed speed ratio Co in a speed-reducing direction as indicated by an arrow of a broken line on the right side of FIG. 2. In conjunction with the operation described hitherto, the first clutch 6 relates to the outputting of relatively high rotational speeds and thus will be referred to as a high clutch in the following description.

Figure 3:
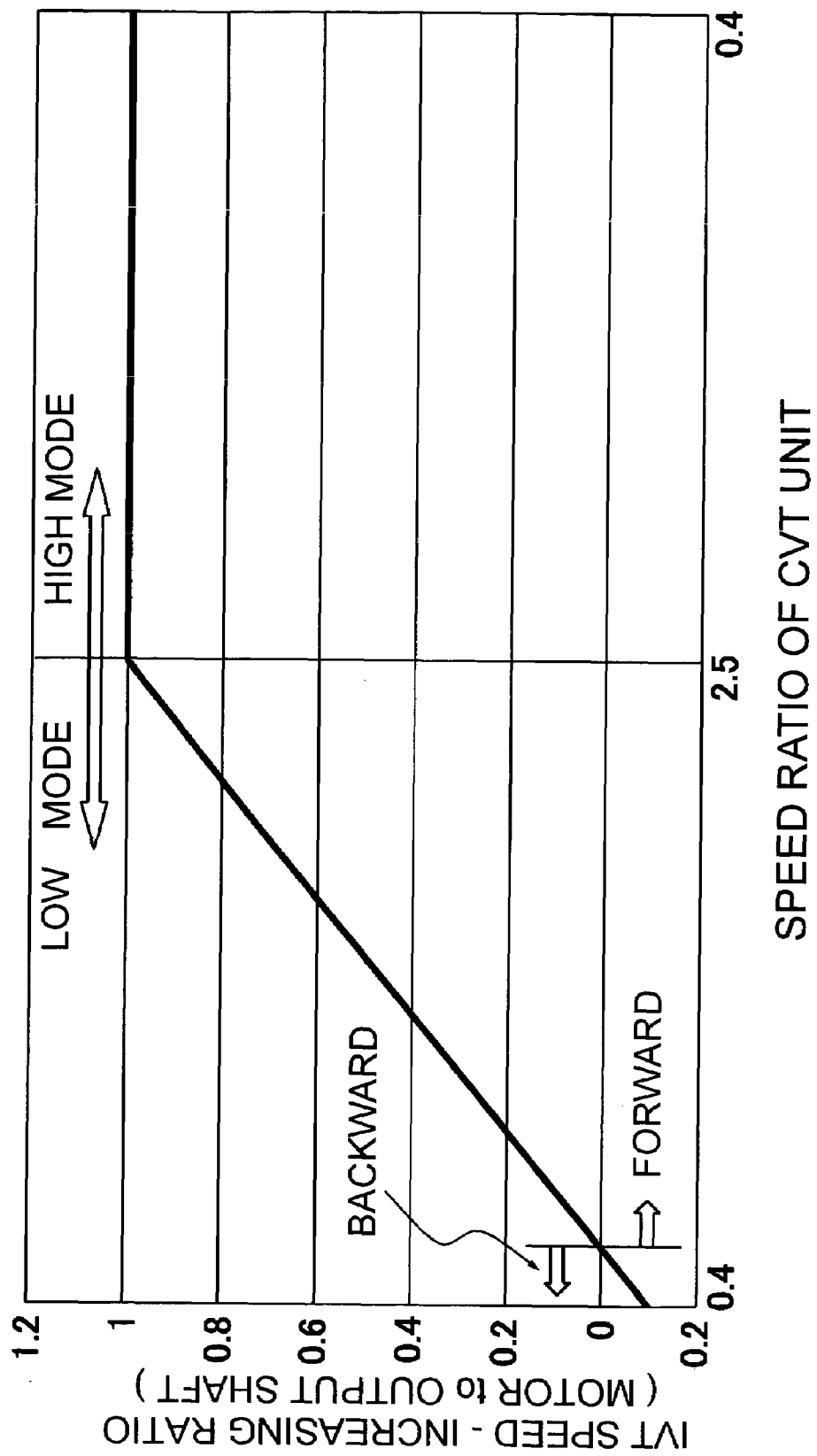
FIG. 3 is a graph showing an operation mode of the power train as a relationship between speed ratios of a CVT unit and speed-increasing ratios of an IVT.

If this relationship is numerically exemplified, a graph showing a relationship between change gear ratios and output speed ratios of the CVT unit 4 as shown in FIG. 3 is obtained. That is, if the change gear ratio of the CVT unit 4 is changed from a minimum value of 0.4 to a maximum value of 2.5, the IVT speed-increasing ratio, which means the ratio of the rotational speed of the final shaft 12 of the power train to the rotational speed of the output shaft 42 of the CVT unit 4, changes from −0.1 to 1 in an engaged state of the low clutch 7 (indicated as "LOW MODE" in FIG. 3). In an engaged state of the high clutch 6 (indicated as "HIGH MODE" in FIG. 3), if the change gear ratio of the CVT unit 4 is then returned from the maximum value of 2.5 to the minimum value of 0.4, the IVT speed-increasing ratio assumes a constant value of 1. In this case, a negative IVT speed-increasing ratio represents reverse rotation of the final shaft 12 of the power train, namely, a backward movement of a vehicle resulting from reverse rotation of an axle connected to the final shaft 12, whereas a positive IVT speed-increasing ratio represents positive rotation of the final shaft 12 of the power train, namely, a forward movement of the vehicle resulting from positive rotation of the axle connected to the final shaft 12.

Figure 4:
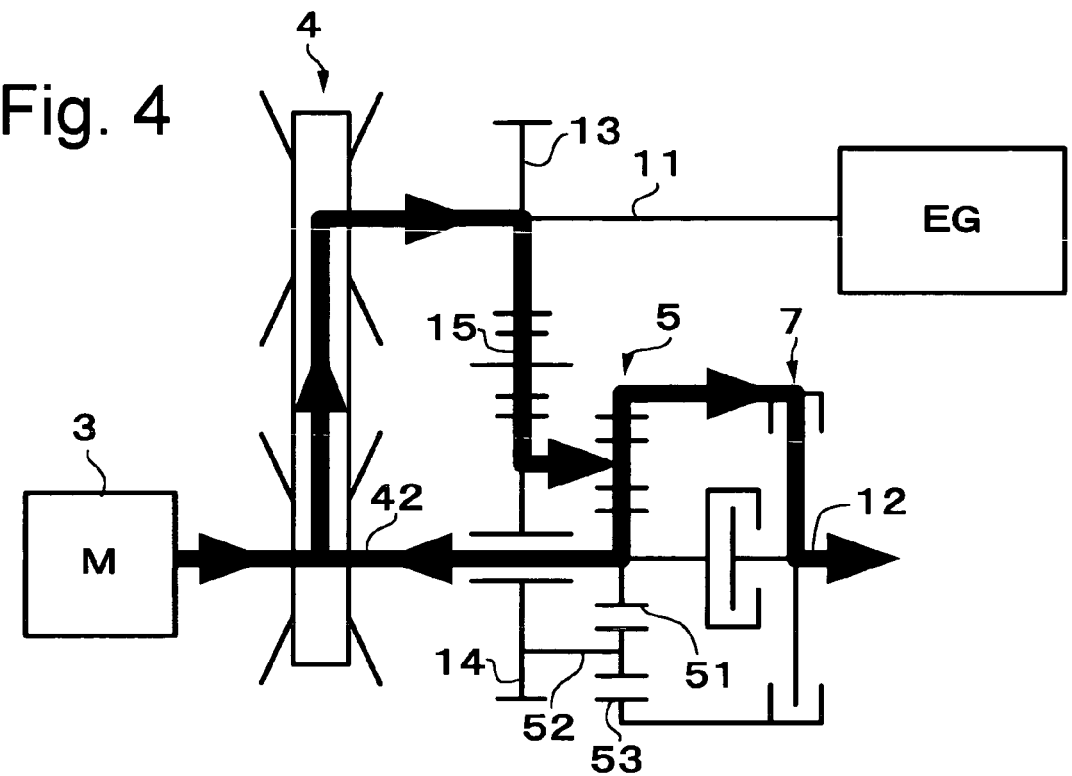
FIG. 4 illustrates how the power train operates in a torque circulation mode.

If the low clutch 7 is engaged to cause the motor 3 to rotate at a high speed with respect to rotation of the final shaft 12 connected to the axle, the aforementioned operation results in a state shown in FIG. 4. That is, an engine torque is transmitted from the input shaft 11 to the carrier 52 via gear trains 13, 15 and 14, and an output torque (indicated by thick arrows in FIG. 4) of the motor 3 is amplified through speed reduction by the CVT unit 4, is also transmitted to the carrier 52 via the gear trains 13, 15 and 14, causes the carrier 52 to rotate at a low speed, and further drives the ring gear 53 at a low rotational speed. The torque transmitted to the ring gear 53 is transmitted as a drive torque to the final shaft 12 connected to the axle via the engaged low clutch 7. A reaction torque resulting from the driving of the ring gear 53 causes the sun gear 51 to generate a counter torque. This torque returns to the CVT unit 4 via the output shaft 42, is combined with the output torque of the motor 3, and is transmitted again to the carrier 52 via the CVT unit 4. This torque is further combined with an engine torque on the input shaft 11 and transmitted again to the carrier 52, thus causing torque circulation. As a result, a so-called torque circulation mode wherein power from the engine and power from the motor circulate through the CVT unit 4 and the planetary gear unit 5 is achieved.

Figure 5:
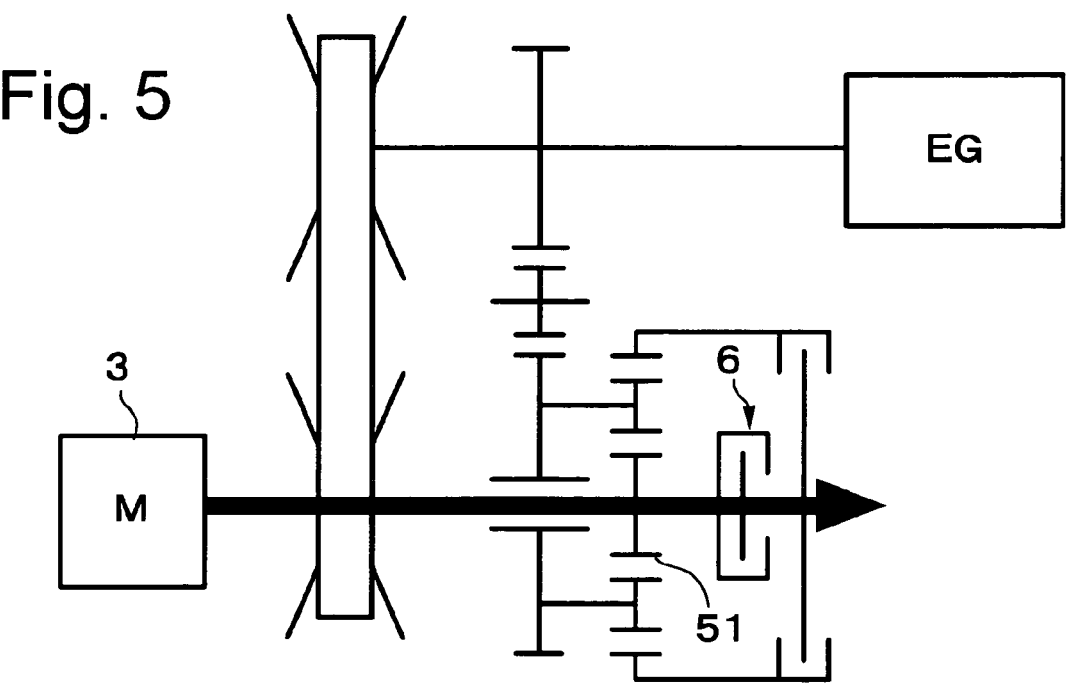
FIG. 5 illustrates how the power train operates in a direct torque transmission mode.

On the other hand, if the high clutch 6 is engaged so as to cause the motor 3 to rotate at the same speed as the final shaft 12 connected to the axle, the ring gear 53 can idly rotate through release of the low clutch 7. The planetary gear set 5 then stops torque transmission. Thereby, an engine torque is transmitted to the final shaft 12 via the CVT unit 4, the sun gear 51 of the planetary gear set 5, and the high clutch 6, and acts as a force for driving the axle. In this case, the sun gear 51 serves simply as a member through which a torque passes. In this state, as indicated by a thick arrow in FIG. 5, an output torque of the motor 3 is directly transmitted from the final shaft 12 to the axle without the intervention of the CVT 4. That is, a so-called direct torque transmission mode is achieved.

As described hitherto, in the torque circulation mode, when the motor is driven (i.e., in a power running state), the power train amplifies a motor torque via the CVT unit 4 and thus makes it possible to output a high torque from the final shaft 12. Further, during regeneration based on coasting, a rotational speed of the motor is increased, by CVT gear ratio, higher than a rotational speed on the side of the axle, whereby energy can be regenerated in a rotational speed range corresponding to high regeneration efficiency. In the direct torque transmission mode, a motor torque can be transmitted to the axle without the intervention of the CVT unit 4. Therefore, the motor torque can be transmitted without any power loss. During coasting, regenerable energy generated in the axle can be regenerated in the motor without being lost in the CVT unit 4.

In this power train, therefore, the torque circulation mode has the same feature as the aforementioned first related art, whereas the direct torque transmission mode has the same feature as the aforementioned second related art. If these modes are used separately, namely, if the torque circulation mode and the direct torque transmission mode are assigned to low speeds and high speeds respectively, disadvantages and advantages of each of the torque circulation mode and the direct torque transmission mode can be eliminated and exploited respectively. More specifically, when the vehicle runs at a low speed, no large motor torque is required and the motor can be used in a high motor efficiency range, whereas, when the vehicle runs at a high speed, high transmission efficiency is achieved.

In addition, in the case where this power train is seen as a hybrid-vehicle drive system comprising the engine and the power train, if part of an engine output is used for generation of electricity by the motor 3 with the low clutch 7 being engaged, the engine 2 is always operated in a high-efficiency output state (with a rotational speed and a throttle load for good fuel consumption), and the time for a partially loaded operational state is reduced. As a result, the overall efficiency of a system including the engine 2 can also be enhanced. In this case as well, as shown in FIG. 6, the motor 3 receives a counter force applied to the sun gear 51 of the planetary gear unit 5. Moreover, a torque is transmitted from the engine 2 to the motor 3 without passing through the CVT unit 4, and a torque is transmitted from the engine 2 to the final shaft 12 without passing through the CVT unit 4. Therefore, high transmission efficiency can be maintained.

FIG. 7 is also a skeleton diagram showing the second embodiment of the present invention. In the second embodiment, an engine-separation clutch is added to the configuration of the aforementioned first embodiment so as to realize a pure EV (electric vehicle) mode by detaching the engine 2 if necessary. Namely, in the second embodiment, a third clutch 8 for disengaging the power train 1 from the engine 2 is provided on a power transmission path at a position upstream of a region where the input shaft 41 of the CVT unit 4 is connected to the engine 2 and a region where the input shaft 41 of the CVT unit 4 is drivingly connected to the second input element 52 of the planetary gear unit 5. In general, the third clutch 8 is so provided as to be closer to the engine 2 than a portion of the drive gear 13 which is fixed to the input shaft 11 of the power train 1. Because the second embodiment is identical in all the other respects with the first embodiment, the other components of the second embodiment are denoted by the same reference symbols as in the first embodiment and will not be described hereinafter.

If the configuration of the second embodiment is adopted, the loss of regenerative energy ascribable to the dragging of the engine 2 can be eliminated by disengaging the engine 2 from the power train 1 during motor regeneration based on coasting. As is the case with an existing hybrid system, the engine 2 can also be use only in rotational-speed and load ranges for good fuel consumption. In this case, it is also possible to eliminate dragging resistance produced by causing the engine 2 to be rotated during fuel cut operation. Further, the engine can also be stopped or restarted at a suitable and required timing while the vehicle runs.

In both the embodiments mentioned above, the motor 3 is disposed on the output shaft 42 of the CVT unit 4 of the power train 1. However, the basic technical concept of the present invention can be realized as long as the motor 3 is directly connected to the first input element 51 of the planetary gear unit 5 on the power transmission path. Hence, modification examples of arrangement of the motor will be described next.

Figure 8:
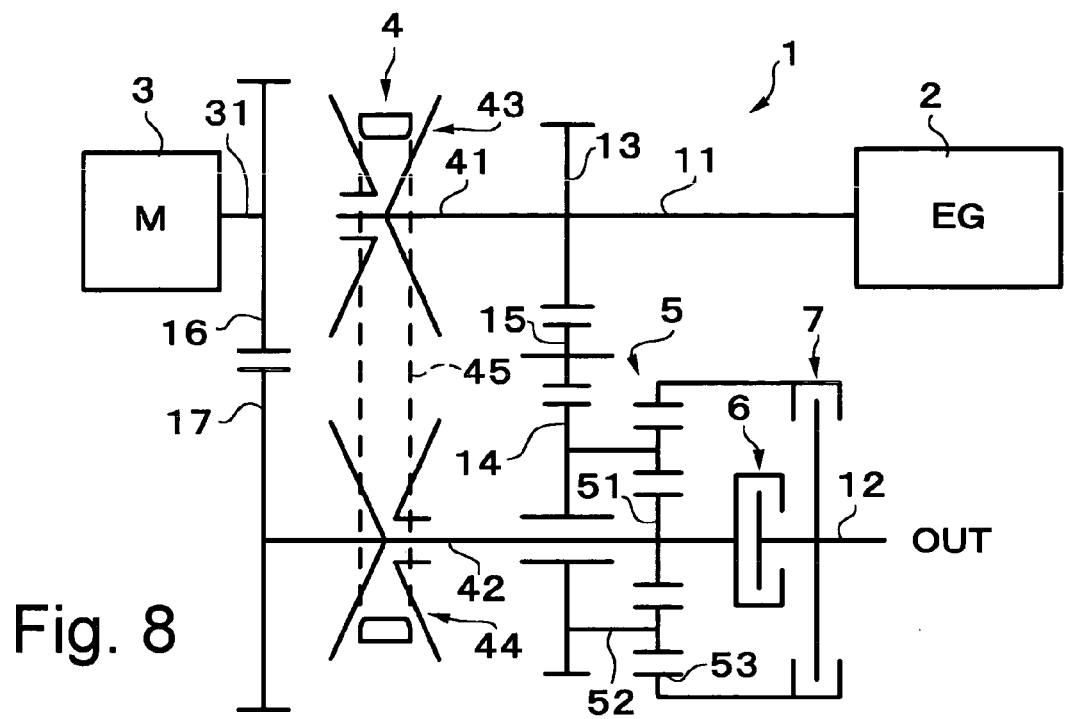
FIG. 8 is a skeleton diagram showing a gear train in accordance with a third embodiment of the present invention.

FIG. 8 shows, as a skeleton diagram, a power train of the third embodiment of the present invention. The third embodiment is a representative example in which the motor 3 is disposed on a shaft different from the output shaft 42 of the CVT unit 4. In this case, the shaft of the motor 3 is parallel to the output shaft 42 of the CVT unit 4 and the first input element or the sun gear 51 of the planetary gear unit 5. Therefore, these components are drivingly connected by a pair of parallel-shaft gears 16 and 17. Namely, a drive gear 16 fixed to a rotor shaft 31 of the motor 3 is meshed with a driven gear 17 fixed to the output shaft 42 of the CVT unit 4. Because the third embodiment is identical in all the other constructional details with the first embodiment, the other components of the third embodiment are denoted by the same reference symbols as in the first embodiment and will not be described hereinafter.

In the case of the third embodiment, since the motor 3 can be disposed on at an arbitrary axial position in the power train 1 as well as at a position coaxial with the input shaft 41 of the CVT unit 41, the degree of freedom in designing the power train 1 can be enhanced. By adopting driving connection of the parallel shafts, a suitable change gear ratio can be set between the rotor shaft 31 of the motor 3 and the first input element 51 of the planetary gear unit 5. Therefore, a small torque and high speed motor can be selected as the motor 3 by setting a speed-reducing ratio (from gear 16 to gear 17), while a large torque and low speed motor can be selected as the motor 3 by setting a speed-increasing ratio.

In the third embodiment, the axial position of the motor 3 is located outside the CVT unit 4. However, it is also possible to adopt a configuration wherein a parallel-shaft driving connection unit is located at an outermost position and wherein the motor 3 is disposed side by side with the CVT unit 4 and the planetary gear unit 5. This construction is advantageous in reducing the overall length of the power train in the case of a horizontal hybrid drive system. Although the gears 16 and 17 as a pair are shown as exemplary components for drivingly connecting the parallel shafts, it goes without saying that other connection units such as a sprocket chain and the like can be employed to realize the connection.

Figure 9:
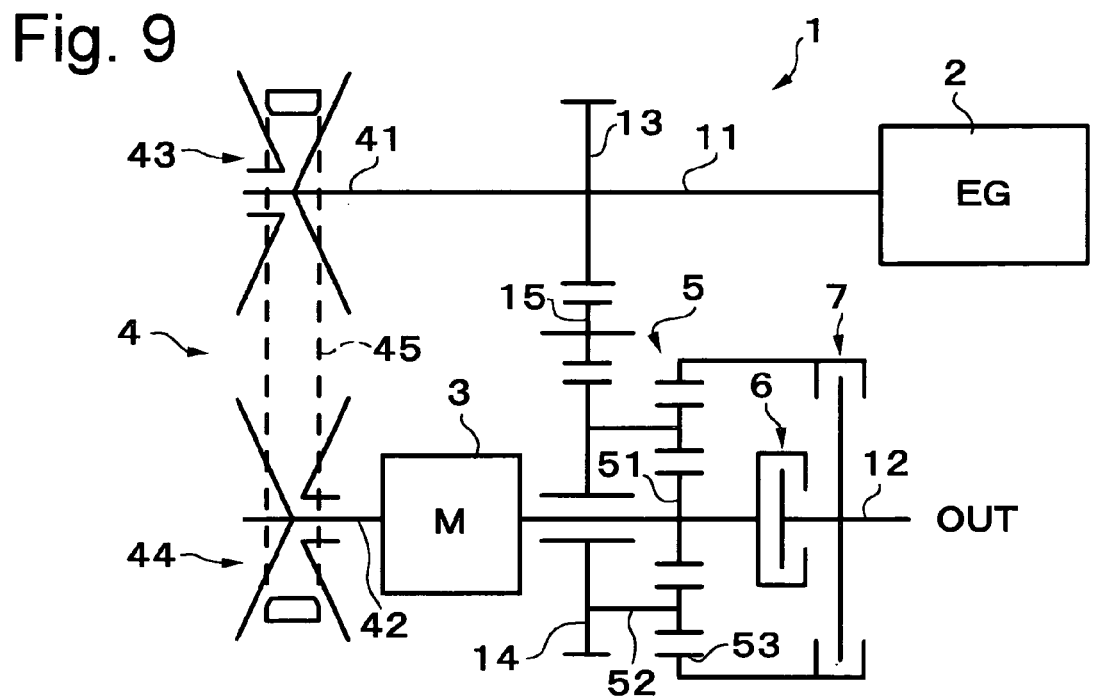
FIG. 9 is a skeleton diagram showing a gear train in accordance with a fourth embodiment of the present invention.
Figure 10:
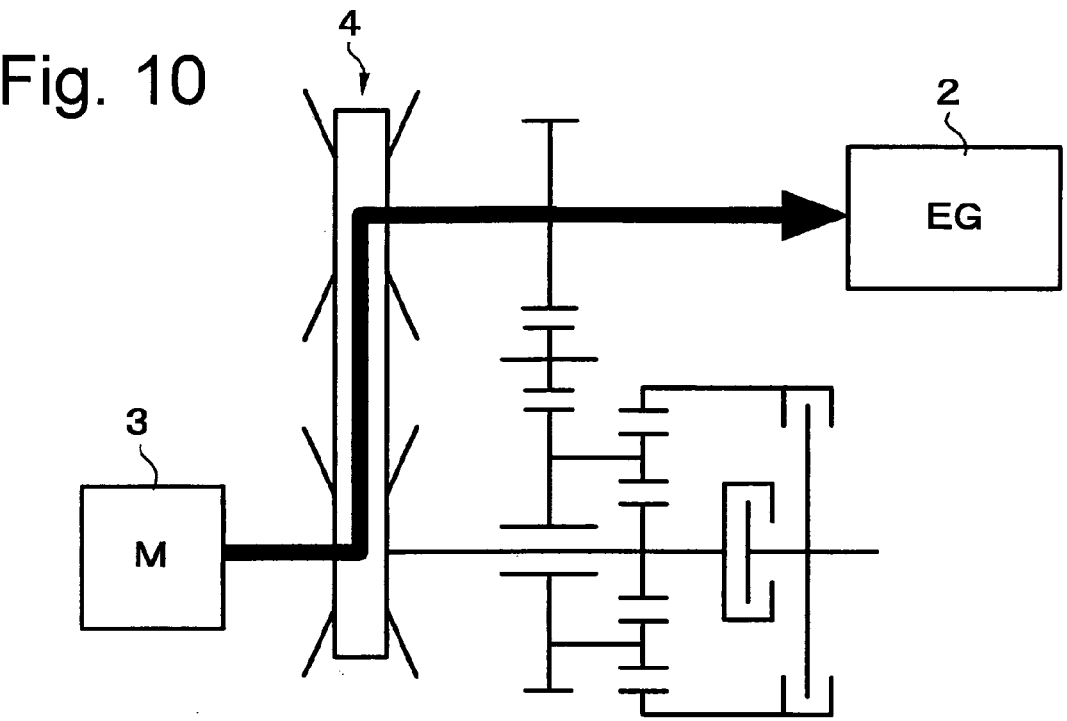
FIG. 10 illustrates, as one mode, how an engine is operated when being started.
Figure 11:
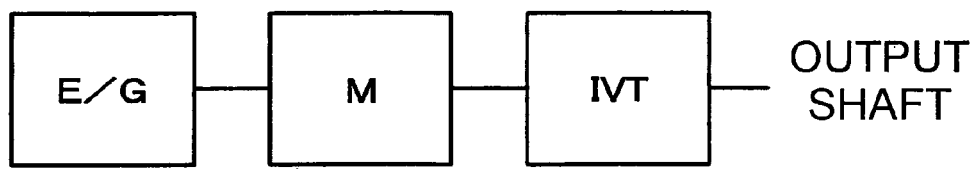
FIG. 11 is a block diagram showing a gear train in accordance with a first related art.
Figure 12:
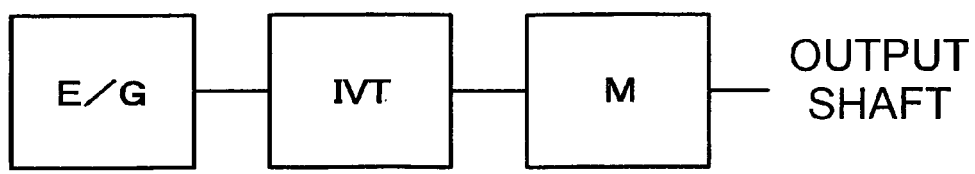
FIG. 12 is a block diagram showing a gear train in accordance with a second related art.

FIG. 9 shows, as a skeleton diagram, a power train of the fourth embodiment of the present invention. The fourth embodiment is a representative example in which the motor 3 is disposed at an axial position between the CVT unit 4 and the planetary gear unit 5. In the case of the fourth embodiment, the rotor shaft of the motor 3 is connected to the output shaft 42 of the CVT unit 4 and the first input element 51 of the planetary gear unit 5. In this case as well, because the fourth embodiment is identical in all the other constructional details with the first embodiment, the other components of the fourth embodiment are denoted by the same reference symbols as in the first embodiment and will not be described hereinafter.

In the fourth embodiment shown in FIG. 9, the motor 3 is disposed coaxially with the CVT unit 4 and the planetary gear unit 5. However, it is also possible to adopt a configuration wherein the motor 3 is disposed on another shaft at the same axial position as shown in FIG. 9 and is connected to the shafts of the CVT unit 4 and the planetary gear unit 5 via the parallel-shaft driving connection unit. As described as to the third embodiment and the modification example thereof, this configuration is advantageous in enhancing the degree of freedom in designing the power train, reducing the overall length of the power train, and selecting a characteristic of the motor. In this case, as a matter of course, other driving connection units such as a pair of gears, a sprocket chain, and the like can be employed to drivingly connect the parallel shafts.

Lastly, an engine-starting method for a hybrid drive system composed of the power train 1 and the engine 2 that are connected with each other will be described. If the engine 2 is equipped with a normal cell motor and a normal alternator, the first embodiment adopts a method wherein the engine is started by being driven by the cell motor and the alternator generates electricity for auxiliaries with both the low clutch 7 and the high clutch 6 being released. In the second embodiment, the engine 2 can also be started only by releasing the third clutch 8 instead of releasing both the clutches 6 and 7. If the engine 2 is equipped with a starter/generator (ISG, ISA), there is adopted a method wherein the starter/generator is used to start the engine and generate electricity for the auxiliaries while the clutches are operated substantially in the same manner as described above.

In either of the first and second embodiments, according to still another method of starting the engine, the engine 2 can be started even if it is not equipped with any starting means. Referring to FIG. 9, since the power train 1 is separated from the axle when both the low clutch 7 and the high clutch 6 are released, there is adopted a method wherein the motor 3 can be use operating substantially in the same manner as the aforementioned starter/generator so as to start the engine 2, and generate electricity for the auxiliaries. In this case, an output torque of the motor 3 is directly transmitted to the first input element 51 of the planetary gear unit 5. Similarly, an output torque of the motor 3 is transmitted to the second input element 52 after having been amplified or damped by the CVT unit 4. However, since both the clutches 6 and 7 are released, the output element 53 idly rotates. Thus, torque transmission via the planetary gear unit 5 does not occur.

Although the embodiments have been exemplified above for a better understanding of the present invention, the present invention is not limited to the exemplified embodiments and can be implemented with its concrete configuration being modified in various manners without departing from the scope defined in the claims. For example, the CVT unit 4 is exemplified as a belt-type CVT unit whose input and output shafts are parallel to each other. However, a friction-wheel-transmission type CVT unit can also be employed as the CVT unit 4. In this case, it is possible to employ not only a friction-wheel-transmission type CVT unit whose input and output shafts are parallel to each other but also a friction-wheel-transmission type CVT unit whose input and output shafts are coaxial with each other. The toroidal transmission unit mentioned initially is a representative example of such a CVT unit. In the case where a CVT unit whose input and output shafts are coaxial with each other is employed, all components, including a motor, a CVT unit, a planetary gear unit, both clutches and also an engine, can be disposed along a single axis. This configuration may suite for a front-engine rear-drive vehicle. It is also suitable that the motor, the CVT unit, the planetary gear unit, and both clutches are arranged, along a single axis, in this order from the side of the engine. Alternatively, the CVT unit, the motor, the planetary gear unit, and both clutches can be arranged, along a single axis, in this order from the side of the engine. In this case, it is advantageous to transmit an engine output to the CVT unit and the planetary gear unit in parallel via a parallel-shaft drive connection unit such as a pair of parallel-shaft gears, a sprocket chain, or the like.

What is claimed is:

1. A hybrid-vehicle power train connected to an engine, comprising:
   an input shaft;
   a final shaft;
   a motor;
   a planetary gear unit with at least three elements comprising: first and second input elements, and an output element;
   a first clutch for engaging/disengaging the first input element of the planetary gear unit with/from the final shaft of the hybrid-vehicle power train;
   a second clutch for engaging/disengaging the output element with/from the final shaft of the hybrid-vehicle power train, and
   a CVT unit having an input shaft and a output shaft, the input shaft is connected to the engine and is drivingly connected to the second input element of the planetary gear unit, the output shaft is connected to the first input element;
   wherein the motor is connected to the output shaft of the CVT unit.

2. The hybrid-vehicle power train according to claim 1, further comprising:
   a third clutch for engaging/disengaging the hybrid-vehicle power train with/from the engine, wherein the third clutch is arranged, and connected between the input shaft of the hybrid-vehicle power train and the engine.

3. The hybrid-vehicle power train according to claim 1, wherein the motor is disposed coaxially on the output shaft of the CVT unit.

4. The hybrid-vehicle power train according to claim 1, wherein the motor is drivingly connected to the output shaft of the CVT unit and is disposed on a shaft different from the output shaft of the CVT unit.

5. The hybrid-vehicle power train according to claim 1, wherein the CVT unit is disposed between the motor and the planetary gear unit.

6. The hybrid-vehicle power train according to claim 1, wherein the motor is disposed between the CVT unit and the planetary gear unit.

7. The hybrid-vehicle power train according to claim 1, wherein the motor is a motor-generator that also has a function of generating electricity.

* * * * *